Sept. 22, 1964　　　　G. S. KNOX　　　　3,149,845

WIDE TEMPERATURE RANGE SEALING STRUCTURE

Filed May 28, 1962

INVENTOR.

GRANVILLE S. KNOX

BY White and Haefliger

ATTORNEYS.

3,149,845
WIDE TEMPERATURE RANGE SEALING
STRUCTURE
Granville S. Knox, Glendale, Calif., assignor to Hydril
Company, Los Angeles, Calif., a corporation of Ohio
Filed May 28, 1962, Ser. No. 198,338
4 Claims. (Cl. 277—26)

This invention relates generally to wide temperature range sealing of inner and outer members, and more particularly concerns the stabilization of the sealing effect of relatively rigid internally tenacious sealing annuli which expand and contract with temperature change.

Tetrafluoroethylene O-rings are widely used as fluid seals because of their exceptional resistance to chemical attack and ability to withstand relatively high operating pressures and temperatures. They have been quite satisfactory for sealing off fluid pressure between concentric, cylindrical metal surfaces provided operating temperatures remained fairly constant. Such rings, however, have in general proved unsuitable for use under conditions of widely fluctuating temperatures, say within a range of —100° F. to 450° F., because of the relatively high coefficient of thermal expansion of tetrafluoroethylene as compared to that of metals. At elevated temperatures the rings attempt to expand outwardly, but being confined between inner and outer metal walls, this is not possible. Upon cooling, however, the rings contract tightly about the inner member and pull away from the outer member. The squeeze fit originally provided for sealing is therefore lost and, unless a relatively high, constant pressure is maintained against the ring, leakage will occur around the outer surface of the ring.

The present invention now makes it possible to prevent such objectionable leakage, by providing novel structure cooperating with the fluorocarbon O-ring, typical molded fluorocarbons including tetrafluoroethylene and fluorinated ethylene-propylene resins such as the materials known as Teflon TFE and FEP produced by E. I. du Pont de Nemours & Company. Basically, such structure includes inner and outer members assembled to form an annular space receiving the annulus or O-ring fluorocarbon seal for sealing off between the members over a wide temperature range characterized in that the O-ring tends to shrink radially upon cooling from temperatures within the higher regions of the range. The outer and inner members respectively have inwardly and outwardly facing shoulders in pressure sealing contact with the seal ring when the members are first assembled, and the outer member has an auxiliary shoulder facing endwise toward the direction of pressure and directly exposed to the ring for establishment of pressure sealing contact therewith when fluid pressure is applied to the opposite side of the O-ring, or upon cooling thereof. Finally, a portion of the outwardly facing shoulder inwardly of the annulus is tapered or inclined endwise in a direction tending to thrust the sealing annulus toward the auxiliary shoulder when the annulus upon cooling shrinks inwardly about the tapered section. It is found that such structure cooperates with the ring to prevent undesirable leakage, even though the ring and the inner and outer members have significantly different temperature coefficients of expansion and the temperature varies over wide limits.

Additional features of the invention include the provision of a circular edge on the inner member adjacent the taper to resiliently penetrate the O-ring when the members are first assembled, the locating of the circular center of gravity line of the ring radially outwardly of the taper on the inner member upon initial assembly, all for the purposes of establishing initial squeeze of the ring between the inner and outer members and of urging or facilitating travel of the ring endwise toward the auxiliary shoulder upon cooling or shrinking of the ring.

These and other objects and advantages of the invention, as well as the details of an illustrative embodiment, will be more fully understood from the following detailed description of the drawing, in which.

Figure 1:
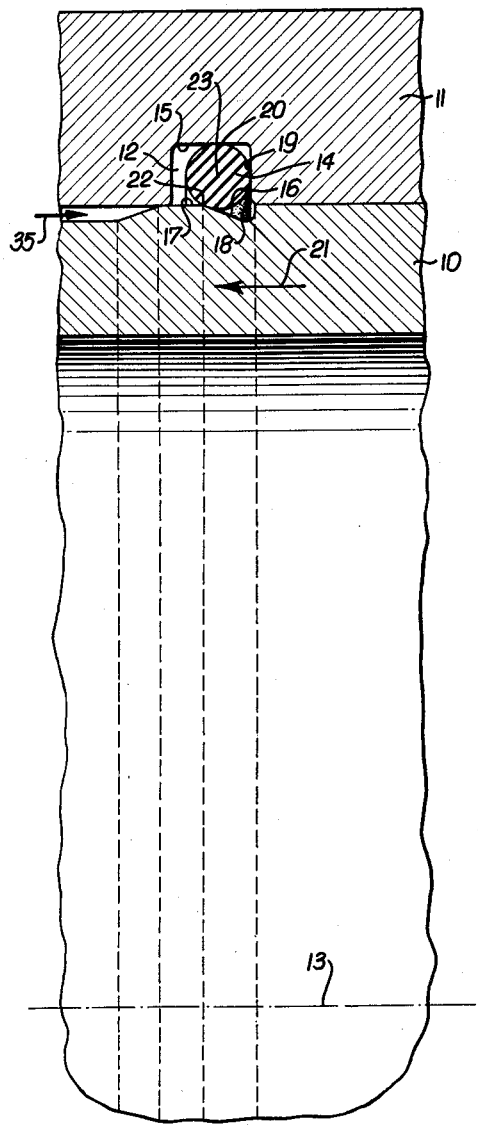
FIG. 1 is an axial radial section through inner and outer tubular members showing the seal in working position.

Referring first to FIG. 1 a pair of endwise extending inner and outer members as for example are indicated at 10 and 11 respectively are shown in coaxial and assembled condition as forming an annular space 12, it being understood that that space extends about the common axis 13. Assembled in the space 12 is a relatively rigid internally tenacious sealing annulus as for example the O-ring 14 which typically comprises molded fluorocarbon resin of the type previously mentioned. Such material has a coefficient of thermal expansion of about .000055, which is more than eight times greater than the coefficient of thermal expansion of steel, .00000636. Since the inner and outer members 10 and 11 are typically made of steel, it can be seen that the cross-section of the O-ring 14 will attempt to increase axially within the cross-section of the groove and it will also attempt to expand outwardly against the inwardly facing shoulder 15 of the member 11, upon substantial temperature elevation.

The inner member 10 has outwardly facing shoulders 16 and 17, and upon cooling of the assembly from elevated temperature the cross-section of ring 14 will tend to decrease axially and the ring will also tend to contract tightly about the inner member and pull away from the outer member. To take advantage of this tendency in such manner as to prevent leakage of fluid pressure by the O-ring, the shoulder portion 16 inwardly of the O-ring, typically is tapered at about 20 degrees with respect to axis 13 in a direction tending to thrust the shrinking sealing annulus toward an auxiliary shoulder 18. The latter faces endwise toward the direction of fluid pressure application and is directly exposed to the annulus or O-ring for establishment of pressure sealing contact therewith upon cooling of the ring, contact typically being made at 19. Accordingly, shrinkage of the ring away from the inwardly facing shoulder 15 and at the location 20 is of no concern as respects leakage because pressure sealing contact is established by pressure engagement of the shrinking ring with the tapered shoulder 16 and with the auxiliary shoulder 18. In this regard, the taper of shoulder 16 is such as to maintain contact with the shrinking ring, despite axial movement thereof.

Upon initial assembly of the combination, as for example is brought about by displacing the inner member 10 relative to the outer member 11 in the direction of the arrow 21, a squeeze fit is provided initially by tight engagement of the ring with the inwardly facing shoulder 15 and with the outwardly facing shoulder 17. The latter intersects the tapered outwardly facing shoulder 16 to define a circular edge 22 which resiliently penetrates the sealing annulus when the members are first assembled. Accordingly, some additional axial force is generated to urge the ring toward the auxiliary shoulder 18 when the ring cools from elevated temperature.

Finally, it will be noted that the bulk of the O-ring section is located radially outwardly of the tapered shoulder 16 when the members are first assembled. This condition may be further described as met by locating the circular center of gravity line 23 radially outwardly of the tapered shoulder 16 when the members are first assembled.

Figure 2:
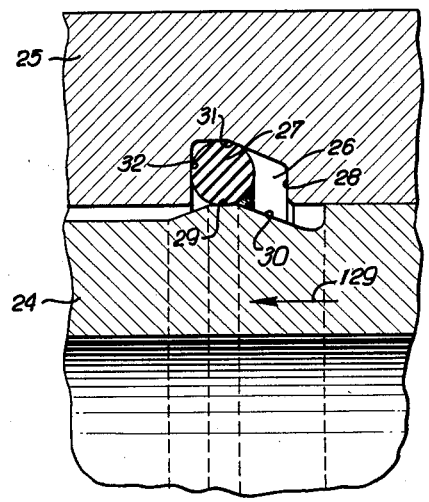
FIG. 2 is a view like FIG. 1 but showing another form of the invention with the ring shown in position during assembly of the tubular members.

Referring now to FIG. 2 the inner and outer members are designated at 24 and 25, and the annular space formed therebetween is illustrated at 26. The auxiliary shoulder facing endwise toward the sealing annulus 27 in the space 26 is designated at 28, and cylindrical and tapered outwardly facing shoulders are shown at 29 and 30.

The inner member 24 in this instance is assembled coaxially into the outer member 25 upon relative movement in the direction of the arrow 129. The position of the ring 27 during such assembly is indicated in FIG. 2, the ring having been radially expanded or stretched to fit tightly over the cylindrical shoulder portion 29, and also to engage the inwardly facing shoulder 31 and the endwise facing shoulder 32 facing toward the shoulder 28.

Figure 3:
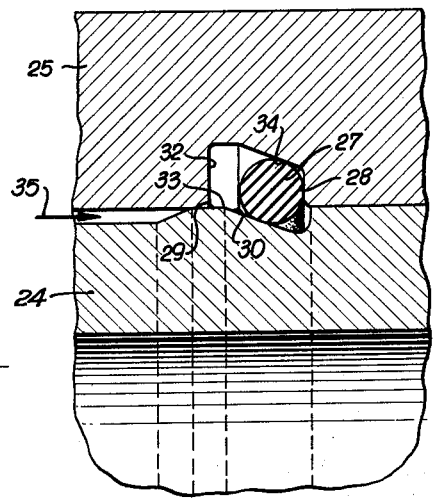
FIG. 3 is a view like FIG. 2 but showing the working position of the ring.

The members 24 and 25 after complete assembly occupy the positions as shown in FIG. 3, with the cylindrical shoulder portion 29 underlying, or lying inwardly of, the shoulder 32. Since the circular edge 33 defined by intersection of the shoulder portions 29 and 30 is spaced from the shoulder 32 by a distance less than the radius of the ring 27, it is clear that upon initial assembly the bulk of the O-ring is initially located radially outwardly of the tapered shoulder portion 30. Accordingly, the stretched ring will contract and travel axially toward and into engagement with the auxiliary shoulder 28 to establish the auxiliary seal against pressure leakage, the low friction coefficient of the fluorocarbon material aiding this action.

Upon temperature increase, the ring will tend to expand leftwardly and upwardly along the tapered shoulder portion 30 while maintaining pressure contact with the tapered shoulder 30 and also with the tapered inwardly facing shoulder 34 of the outer member 25. Upon cooling from elevated temperature the ring will contract radially and re-engage the auxiliary shoulder 28 to establish a seal.

While the tapered shoulders 30 and 34 may extend frusto conically substantially parallel, it is also contemplated that they may diverge slightly relative to one another and in a rightward sense as viewed in FIGS. 2 and 3, in order that upon ring expansion the ring will wedge therebetween, and also in order that upon ring contraction there will be reduced blockage of ring displacement toward and into engagement with the auxiliary shoulder 28. In FIGS. 1 and 2, the direction of pressure application is indicated by the arrows 35.

I claim:

1. The improvement combination, which comprises endwise extending inner and outer members assembled to form an annular space, and a relatively rigid internally tenacious sealing annulus of fluorocarbon type material assembled in said space for sealing off between said members over a temperature range characterized in that the annulus tends to shrink radially upon cooling from temperatures within the higher regions of said range, the outer and inner members respectively having inwardly and outwardly facing shoulders in pressure sealing contact with said annulus when the members are first assembled, said outer member having an auxiliary shoulder facing endwise toward said sealing annulus for establishment of pressure sealing annular engagement therewith, a portion of said outwardly facing shoulder inwardly of the annulus tapering endwise in a direction tending to thrust the sealing annulus toward the auxiliary shoulder when the annulus upon cooling shrinks inwardly about said tapered portion, that portion of said inwardly facing shoulder which lies outwardly of said tapered portion of the outwardly facing shoulder being itself tapered to extend in substantially parallel relation therewith, thereby to prevent forcible reduction of the radial thickness of the annulus by said inwardly and outwardly facing shoulders as the annulus moves toward said auxiliary shoulder for engagement therewith.

2. The invention as defined in claim 1 in which said members are tubular and coaxial, said taper of said inner and outer shoulder portions being about 20 degrees.

3. The improvement combination, which comprises endwise extending inner and outer members assembled to form an annular space, and a relatively rigid internally tenacious sealing annulus of fluorocarbon type material assembled in said space for sealing off between said members over a temperature range characterized in that the annulus tends to shrink radially upon cooling from temperatures within the higher regions of said range, the outer and inner members respectively having inwardly and outwardly facing shoulders in pressure sealing contact with said annulus when the members are first assembled, said outer member having an auxiliary shoulder facing endwise toward said sealing annulus for establishment of pressure sealing annular engagement therewith, a portion of said outwardly facing shoulder inwardly of the annulus tapering endwise in a direction tending to thrust the sealing annulus toward the auxiliary shoulder when the annulus upon cooling shrinks inwardly about said tapered portion, that portion of said inwardly facing shoulder which lies outwardly of said tapered portion of the outwardly facing shoulder extending in divergent relation thereto in a direction toward said auxiliary shoulder, thereby to prevent forcible reduction of the radial thickness of the annulus by said inwardly and outwardly facing shoulders as the annulus moves toward said auxiliary shoulder for engagement therewith.

4. The invention as defined in claim 3 in which said members are tubular and coaxial, said outwardly facing shoulder having a cylindrical portion intersecting said tapered portion to define a circular edge which penetrates the sealing annulus when said members are completely assembled, said inner shoulder portion taper being about 20 degrees.

References Cited in the file of this patent

UNITED STATES PATENTS

| 2,277,990 | Lanninger | Mar. 31, 1942 |
| 2,690,360 | Young | Sept. 28, 1954 |

OTHER REFERENCES

The Seals Book (Machine Design) Jan. 19, 1961 (page 70), The Penton Publishing Co., Cleveland, Ohio.